United States Patent
Akano

(10) Patent No.: US 7,116,268 B2
(45) Date of Patent: Oct. 3, 2006

(54) POSITION MEASURING APPARATUS

(75) Inventor: Hiroki Akano, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 231 days.

(21) Appl. No.: 10/801,478

(22) Filed: Mar. 16, 2004

(65) Prior Publication Data
US 2005/0046614 A1 Mar. 3, 2005

(30) Foreign Application Priority Data
Aug. 28, 2003 (JP) ............... 2003-304845

(51) Int. Cl.
G01S 5/14 (2006.01)
(52) U.S. Cl. ............... 342/357.02; 342/357.04
(58) Field of Classification Search ........... 342/357.02, 342/357.04, 357.09, 357.15; 701/209–210, 701/214–215
See application file for complete search history.

(56) References Cited

U.S. PATENT DOCUMENTS

| 5,248,981 | A | * | 9/1993 | Yoshihara et al. ..... 342/357.15 |
| 5,495,257 | A | * | 2/1996 | Loomis ................. 342/357.03 |
| 6,278,944 | B1 | * | 8/2001 | Lui et al. ................... 701/215 |
| 6,331,836 | B1 | * | 12/2001 | Jandrell ....................... 701/214 |
| 6,429,815 | B1 | * | 8/2002 | Soliman ................ 342/357.15 |
| 6,430,505 | B1 | * | 8/2002 | Green .................... 342/357.15 |
| 6,539,294 | B1 | * | 3/2003 | Kageyama .................... 701/209 |
| 2004/0049341 | A1 | * | 3/2004 | Fujiwara ..................... 701/210 |
| 2005/0033515 | A1 | * | 2/2005 | Bozzone ..................... 701/214 |

FOREIGN PATENT DOCUMENTS

| JP | 9-297171 | | 11/1997 |
| JP | 2000-111648 | | 4/2000 |
| JP | 2002048569 | A * | 2/2002 |
| JP | 2003006765 | A * | 1/2003 |
| JP | 2005195493 | A * | 7/2005 |

* cited by examiner

Primary Examiner—Thomas H. Tarcza
Assistant Examiner—F H Mull
(74) Attorney, Agent, or Firm—Katten Muchin Rosenman LLP

(57) ABSTRACT

A position measuring apparatus is disclosed. The apparatus has a receiver for receiving signals from multiple satellites and measuring the position of a mobile station based on the received signals. In addition, an angle determination unit determines angle range depending on the positional relation between the measured position of the mobile station and an obstacle. An orbit information extraction unit extracts orbit information indicating orbits of the satellites from the received signals. A measurement unit measures the quality of the signals from at least one satellite that is expected to exist within the angle range based on the extracted orbit information. Finally, a correction unit corrects the position of the mobile station to another position having a different height, according to the measured quality of the signal from the within-angle range satellite.

24 Claims, 10 Drawing Sheets

POSITION MEASURING APPARATUS

BACKGROUND OF THE INVENTION

1. Field of the Invention

The present invention generally relates to a position measuring technical field using radio signals, and especially relates to a position measuring apparatus employing the GPS (Global Positioning System).

2. Description of the Related Art

In recent years and continuing, apparatuses for measuring positions utilizing the GPS are increasing. In general, the GPS is a system in which positions of two or more dimensions can be very precisely measured utilizing signals from at least three satellites out of about 24 satellites orbiting the earth. More specifically, triangulation type measurement, PHS type measurement, differential GPS type and other types of measurement are employed for measuring positions. These technologies are used for car navigation or in PDAs, and the positions of mobile stations or PDA's users are measured. The GPS utilizes radio waves emitted from satellites, and therefore satisfactory position measurement is not obtained in bad communication environments where the lines-of-sight between satellites and a position measuring apparatus (GPS receiver) are disturbed.

In this regard, conventionally Japanese Patent Laid-Open Publication 2000-111648 discloses a position measuring technology in which a position ID oscillator emitting infrared signals containing a position ID is provided indoors, a mobile station receives radio waves from satellites outdoors and receives the infrared signals indoors, and accordingly position measurement can be done outdoors and indoors.

Japanese Patent Laid-Open Publication 9-297171 discloses another technology in which a mobile object to be monitored is equipped with a detector for determining whether to receive signals from satellites, and accordingly it can be determined whether the object is located indoors or outdoors.

By the way, although position measurement techniques such as GPS provide highly precise position determination, errors of about 10 meters are normally unavoidable. Such errors cause no problem in wide space flatlands, but there exists a serious problem if an object to be monitored is on the boundary between a building and a road because there is a big difference between whether the object is on a roof of the building or on the road at the periphery of the building.

FIG. 1 is a schematic view illustrating positional variations of a mobile station, a building and measured coordinates. FIG. 1(A) is a top plan view seen from above a building, and FIG. 1(B) is a perspective view. It is assumed that a mobile station or its user 102 is actually located on a roof of the building 104, as seen in FIGS. 1(A) and 1(B). The position coordinates measuring is performed periodically at every one second, and measured coordinates 106 are obtained at every one second. However, the measured coordinates vary within a certain area 108. In FIG. 1, the variation area is indicated by a circle having a radius of several meters. This circle area includes two regions; one region is on the building 104 and the other region is on a road adjacent to the building 104. Accordingly it is unclear whether the mobile station 102 is located on the roof of the building or not, and therefore there is large uncertainty regarding the position of the object to be monitored.

With reference to FIG. 2 showing schematic views similar to FIG. 1, in a case where the mobile station 102 is actually on a road adjacent to the building 104, signals from some satellites are blocked off by the building. Accordingly the variation area becomes larger, because the signals utilized for measuring the position are limited, resulting in lower precision. Therefore, it is more uncertain whether the mobile station 102 is located on the roof of the building, than in FIG. 1.

Both of the conventional techniques disclosed in the above two Japanese Patent Documents determine whether a mobile station is located indoors or outdoors. However, a roof of a building and a road adjacent the building are both outdoors, and therefore it is difficult for those conventional techniques to determine whether a mobile station is located on the roof of the building or a road adjacent to the building.

On the other hand, it is theoretically possible to solve the above problem by measuring a position of a mobile station in a three-dimensional mode including height measurement. However, three dimensional measurement needs to receive satisfactory signals from four or more satellites. When more than three satellites cannot be captured (signals received satisfactorily), it is difficult to perform three-dimensional measurement. Further, even if more than three satellites can be captured, the measurement accuracy in the height direction is generally worse (for example, 1.5 times worse) than that in the horizontal direction. Therefore, it is difficult to determine whether a mobile station is located on a roof of a building having a height lower than 10 meters or not, although that information is of great practical use.

A DOP scheme for improving measurement accuracy is known, in which an amount called DOP (Dilution of Precision) is utilized to stop outputting unreliable measured coordinates. The DOP is a parameter that indicates the probabilities of measured coordinates based on geometric configurations of used satellites with regard to a mobile station. For example, if all the three satellites used for measuring position exist in similar directions, DOP has a large value, which means reliability of the position coordinates is low. By limiting measured coordinates having large DOPs and allowing only small DOP coordinates to be output, it becomes possible to output highly reliable measured coordinates only. However, when the mobile station 102 is on a road close to the building 104 as shown in FIG. 2, its DOP is generally large, and therefore it becomes impossible to output measured coordinates.

Accordingly, it is desirable to provide a position measuring apparatus that can measure the position of a mobile station very precisely using the GPS.

SUMMARY OF THE INVENTION

An aspect of the present invention is to provide a position measuring apparatus, comprising:

a receiver for receiving signals from a plurality of satellites and measuring a position of a mobile station based on the received signals;

an angle determination unit for determining angle range depending on positional relations between the measured position of the mobile station and an obstacle;

an orbit information extraction unit for extracting orbit information indicating orbits of the satellites from the received signals;

a measurement unit for measuring quality of the signals from at least one satellite that is expected to exist within the angle range based on the extracted orbit information; and a correction unit for correcting a position of the mobile station from the measured position to another position having a different height, according to the measured quality of the signal from the at least one satellite.

Another aspect of the present invention is to provide such position measuring apparatus further comprising:

a display for displaying positions of the mobile station and the obstacle on a screen.

Further, another aspect of the present invention is to provide such position measuring apparatus wherein the correction unit corrects whether the mobile station is on a roof of a building or on a road at the periphery of the building.

Further still, another aspect of the present invention is to provide such position measuring apparatus wherein the correction unit determines that the mobile station is on the roof of the building, when strength of the signal from the at least one satellite exceeds a predetermined value.

Further still, another aspect of the present invention is to provide such position measuring apparatus wherein the correction unit determines that the mobile station is on the road at the periphery of the building, when strength of the signal from the at least one satellite is less than a predetermined value.

Further still, another aspect of the present invention is to provide a position measuring apparatus mounted in a fixed reference station, for estimating a position of a mobile station moving in an area in communication with the fixed reference station, comprising:

a memory for storing position information relating to an obstacle;

a receiver for receiving position information of the mobile station that has been measured by the mobile station based on signals from a plurality of GPS satellites, and for receiving mobile station satellite information indicating at least one satellite from which the mobile station has received a signal;

a collator for collating reference station satellite information indicating at least one satellite from which the reference station has received a signal, with the mobile station satellite information; and a correction unit for correcting the measured position of the mobile station based on a result of the collation and coordinates of the obstacle.

Further still, another aspect of the present invention is to provide a position measuring apparatus provided in a mobile station, for estimating a position of the mobile station moving in an area in communication with a fixed reference station, comprising:

a memory for storing position information relating to a building;

a position measuring unit for measuring a position of the mobile station, based on signals from a plurality of GPS satellites;

a receiver for receiving reference station satellite information indicating at least one satellite from which the reference station has received a signal;

a collator for collating mobile station satellite information indicating at least one satellite from which the mobile station has received a signal, with the reference station satellite information; and a correction unit for correcting the measured position of the mobile station based on a result of the collation and coordinates of the building.

Further still, another aspect of the present invention is to provide a position measuring apparatus for measuring a position of the apparatus using signals received from a plurality of satellites, comprising an obstacle reflecting means containing obstacle information, characterized in that if the apparatus cannot receive a signal from a satellite or quality of a received signal is lower than a predetermined value, the obstacle determines that the apparatus is not positioned in an area where there is no obstacle between the satellite and the apparatus or determines that reliability for the measured position of the mobile station is lower than that in a case where the mobile station is positioned in said area.

Further still, another aspect of the present invention is to provide a position measuring apparatus for measuring a position of the apparatus using signals received from a plurality of satellites, comprising a correction unit, characterized in that if there is an obstacle between the measured position of the apparatus and a satellite and a signal from the satellite can be received or its quality is higher than a predetermined value, then the correction unit corrects the measured position of the apparatus to an area where there is no obstacle between the satellite and the apparatus.

Further still, another aspect of the present invention is to provide a position measuring apparatus for measuring a position of the apparatus using signals received from a plurality of satellites, comprising a correction unit, characterized in that if there is no obstacle between the measured position of the apparatus and a satellite and a signal from the satellite cannot be received or its quality is lower than a predetermined value, then the correction unit corrects the measured position of the apparatus to an area where there is an obstacle between the satellite and the apparatus.

Accordingly, the present invention provides a position measuring apparatus that substantially obviates one or more of the problems caused by the limitations and disadvantages of the related art.

DESCRIPTION OF THE PREFERRED EMBODIMENTS

In the following, embodiments of the present invention are described with reference to the accompanying drawings. Through all the figures, the same parts are assigned the same reference numbers.

(First Embodiment)

Figure 1:
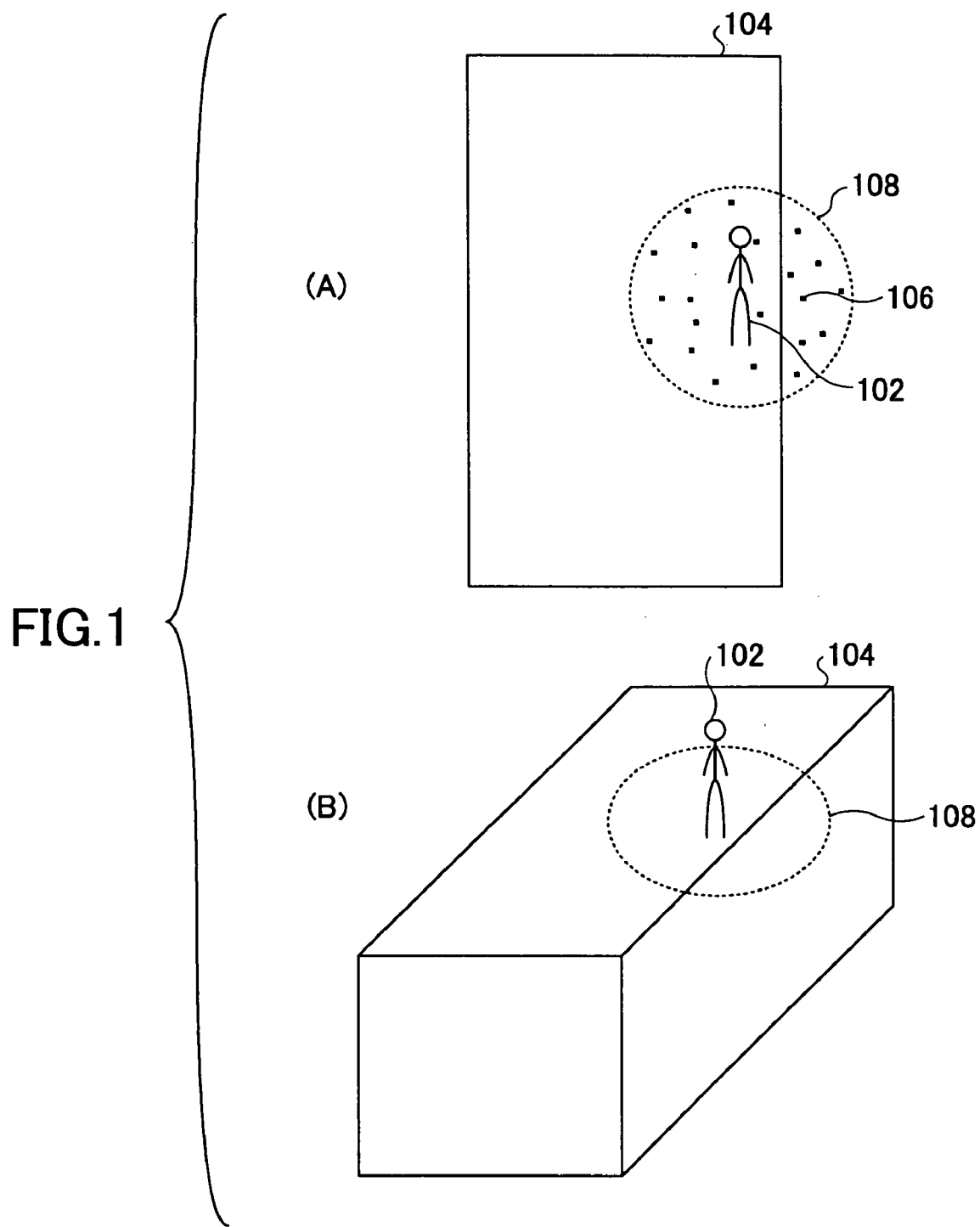
FIG. 1 contains schematic views illustrating positional variations of a mobile station, a building and measured coordinates.
Figure 2:
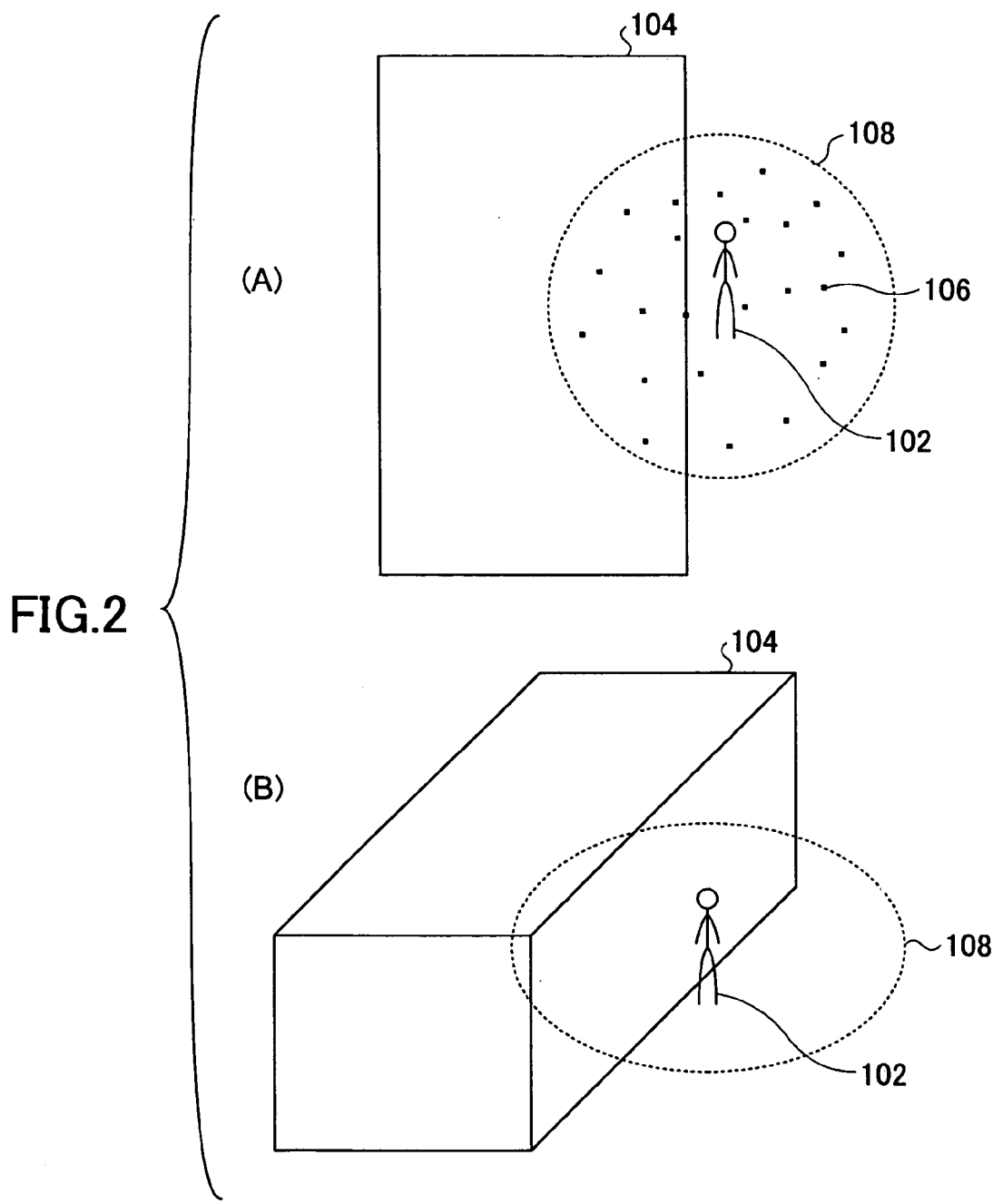
FIG. 2 contains schematic views illustrating additional positional variations of a mobile station, a building and measured coordinates.
Figure 3:
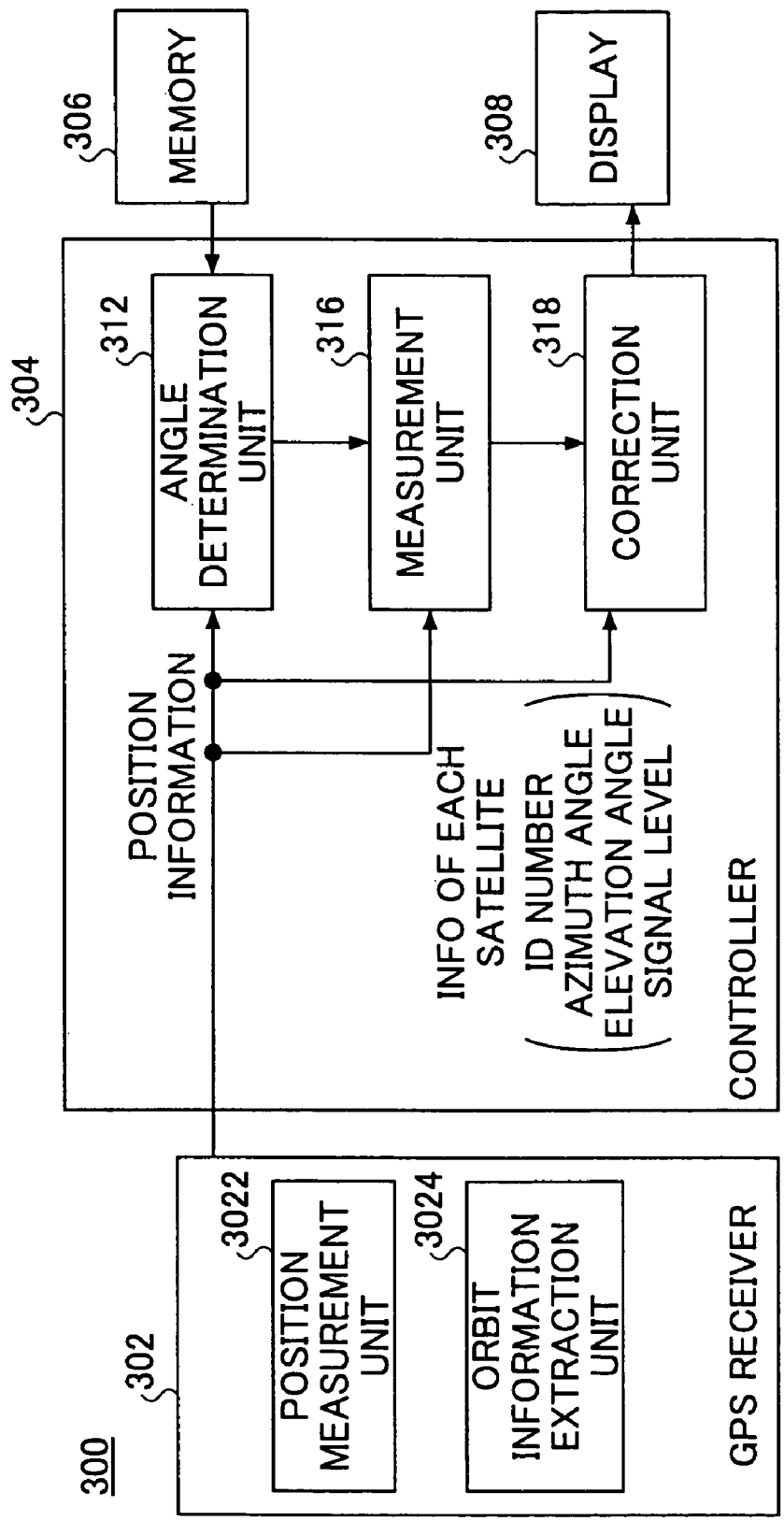
FIG. 3 is a block diagram of a position measuring apparatus according to a first embodiment of the present invention.

FIG. 3 shows a block diagram showing the main functions of a position measuring apparatus (or position calculation apparatus) in a mobile station according to a first embodiment of the present invention. Parts shown in FIG. 3 are assigned reference numbers beginning with 3. A position measuring apparatus 300 generally has a GPS receiver 302 for receiving signals from satellites, a controller 304 (including obstacle information reflecting means and a correction unit) for processing signals received by the GPS receiver 302, a memory 306 for storing information, and a display 308 for displaying a position of the mobile station according to the controller. Other elements in the mobile station are omitted for simplicity.

The GPS receiver 302 receives signals from some satellites, for example, eight satellites out of 24 satellites orbiting the earth, in order to utilize the signals for measuring the position of the mobile station. These signals include cord information called C/A cord, orbit information indicating the orbit of each satellite and other information. The GPS receiver 302 includes a position measurement unit 3022 for measuring the position of the mobile station based on the signals received from the satellites. The GPS receiver 302 further includes an orbit information extraction unit 3022 for extracting orbit information of the satellites from the signals received from the satellites.

Figure 4:
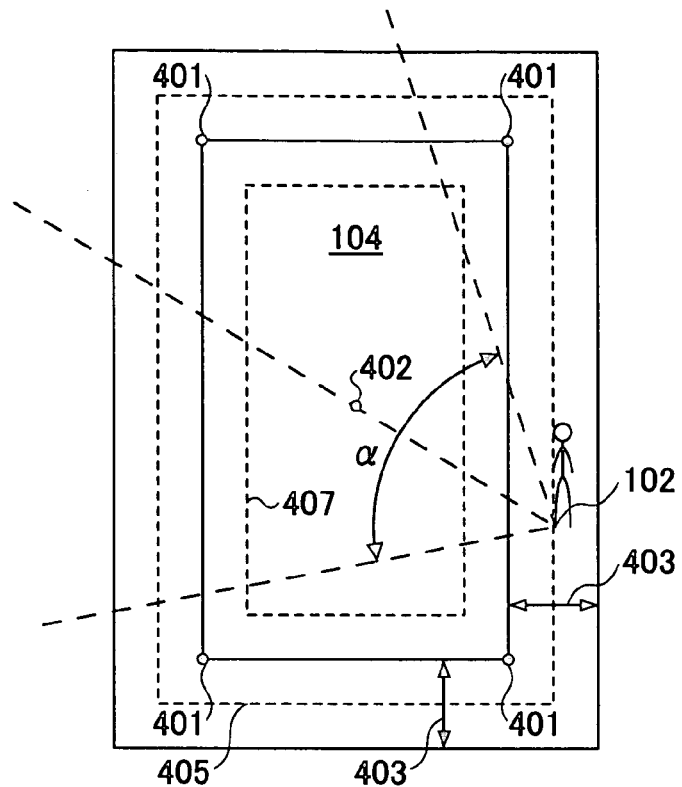
FIG. 4 is a schematic plan view illustrating positional relationship between a mobile station and a building.
Figure 5:
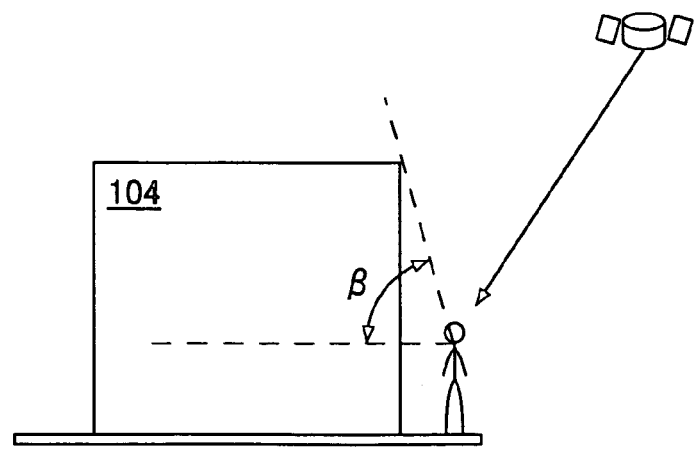
FIG. 5 is a schematic elevational view illustrating positional relationship between a mobile station and a building.

The controller 304 includes an angle determination unit 312 that determines an angle range depending on the positional relationship between the mobile station and an obstacle such as a building. For example, as seen in FIGS. 4 and 5, the angle range may include an azimuth angle $\alpha$ and an elevation angle $\beta$. The controller 304 extracts orbit information indicating the orbit of each satellite from the orbit information extraction unit 3024. Preferably, it is possible for each satellite to transmit another satellite's orbit information in order to allow the GPS receiver to know the orbit of each satellite. The controller 304 includes a measurement unit 316 that measures the signal qualities (signal strength, S/N ratio and other adequate parameters) from satellites existing within the angle range determined by the angle determination unit 312, and/or measures whether it is possible to receive the signals from the satellites within the angle range. What satellites exist within the angle range can be determined based on the position coordinates of the mobile station and the orbit information. The controller further includes a correction unit 318 that corrects the measured coordinates of the mobile station according to a procedure explained below with reference to FIG. 6.

The memory 306 stores a variety of information used in the controller 304 and/or the display 308. For example, the memory 306 stores corner coordinates 401 defining a building area in a two dimensional plane, the central coordinates 402, width 403 defining a predetermined area surrounding the building, reference lines 405, 407, etc. The central coordinates 402 can be calculated as the center of gravity of the area surrounded by the corner coordinates 401 in a non-limiting sense. Alternatively, the central coordinates 402 use other reference points. The central coordinates 402 are utilized by the controller 304 (especially the angle determination unit 312) to determine the relative positional relation between the mobile station 102 and the building 104. The reference lines 405 and 407 are the set of points that could be corrected coordinates. The width 403 defines an area on a road at the periphery of the building 104, to where the measured position would be corrected according to the embodiments of the present invention. The measured position can be corrected to anywhere in the area surrounded by the corner points 401 or the area having the width 403 surrounding the building 104. Although the size of the width 403 can be determined freely, it is desired not to increase the width 403 too much and to make it substantially the same as the variation range of the coordinates measured by the GPS.

The information stored in the memory 306 includes parameters $\alpha$ and $\beta$ defining the angle range and being determined depending on the positional relation between the building 104 and the mobile station 102. The angle range is defined by an azimuth angle range of $\alpha/2$ to both right and left directions from the central line extending from the measured coordinates of the mobile station and the central coordinates 402, and an elevation angle range of $0 \sim \beta$ (see FIG. 5). Further, the information stored in the memory 306 includes a threshold L for signal levels of received signals, map information such as road map information, and any other information to be used in the controller 304.

Although a "building" is employed as an obstacle for simple explanation in the above embodiment, any other obstacle information regarding mountains and other obstacles blocking off the line of sight can be stored in the memory 306, in addition to man-made buildings. The obstacle information can be simplified to, for example, three-dimensional data (natural obstacles or buildings) or two dimensional data (horizontal and vertical cross-sectional forms including the center of buildings). The information is stored in the memory 306 to utilize for correcting the measured position. The measured position can be corrected within the error range of the GPS. If signal quality from a certain satellite is lower than the threshold or no signal can be received from the certain satellite, the measured position can be corrected to an area that is shaded by the obstacle from the satellite.

The display 308 can display positions of the mobile station and the building, and neighboring map information on a screen.

Figure 6:
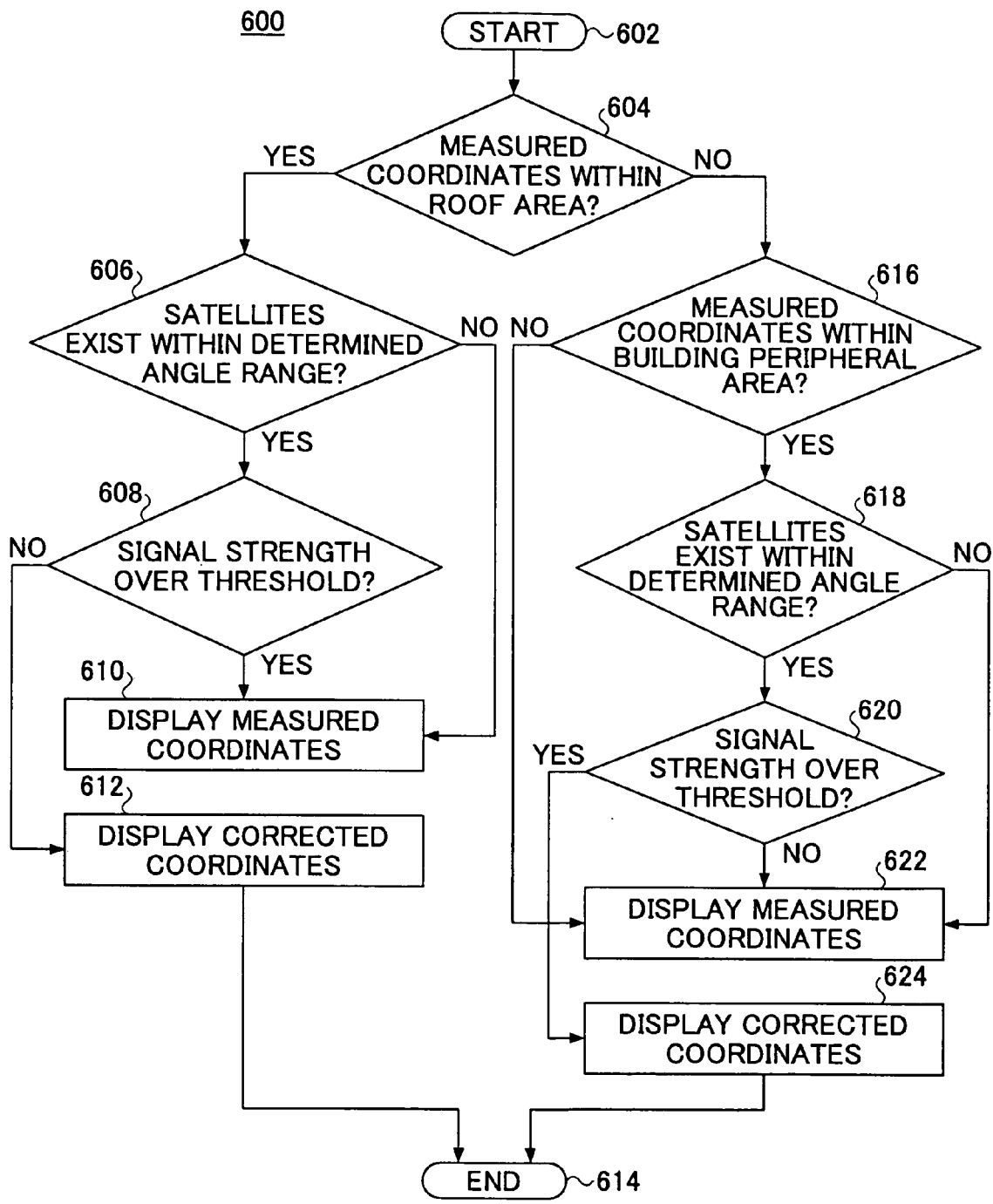
FIG. 6 is a flowchart illustrating operation of the position measuring apparatus according to the first embodiment.

FIG. 6 shows a flowchart 600 illustrating a procedure of correcting a measured position of a mobile station according to the first embodiment of the present invention. The flow chart 600 starts at step 602. The GPS receiver 302 (FIG. 3) receives signals from satellites, and the position measurement unit 3022 in the GPS receiver 302 measures position coordinates (measured coordinates) of the mobile station. The measured coordinates can be obtained by triangulation method by measuring distances between the mobile station and three or more satellites and their distance differences. And of course the measured coordinates can be obtained by other methods. The procedure 600 goes to step 604.

At step 604, it is determined whether the measured position (coordinates) is within an area on a roof of the building. This determination can be performed by utilizing the measured coordinates and corner coordinates 401 (FIG. 4). If the measured position is within the area on the roof of the building, the procedure goes to step 606.

At step 606, it is determined whether there exists a satellite within the angle range determined by the angle determination unit 312. This determination can be performed by utilizing the orbit information extracted from the orbit extraction unit 3024 and the angle range. That is, it is determined whether there exists a satellite within an area defined by the azimuth angle α and the elevation angle β as shown in FIGS. 4 and 5. This determination at this time is performed based on the orbit information and the measured coordinates only, and it is not considered whether the signal from the satellite is blocked off by the building or not. If there exists a satellite within the angle range, the procedure 600 goes to step 608.

Step 608 measures signal quality such as signal strength of the signals from the satellite existing within the angle range. And it is determined by the measurement unit 316 whether the signal quality exceeds a predetermined value (threshold) or it is determined by the measurement unit 316 whether such signal from the satellite can be received. If the signal quality exceeds the predetermined value, the procedure 600 goes to step 610. The number of satellites existing within the angle range is not limited to one and can be plural. In this plural case, all the signal strengths from all the satellites exceed the predetermined value, the procedure goes to step 610.

At step 610, the measured point (coordinates) is displayed on the display as it is. In another words, the measured point (the mobile station on the roof) is highly reliable or probable, and therefore displayed as the position of the mobile station. If the mobile station actually is not on the roof, the answer of step 608 is NO. In this case where the mobile station is on a road, almost the whole determined angle range is shaded by the building. Therefore, even if some satellites exist within the angle range, the signals from the satellites are blocked off and cannot be received at the mobile station with sufficient strength. Accordingly the answer of step 608 becomes NO, and the procedure goes to step 612.

At step 612, the correction unit 318 corrects the measured coordinates and the corrected point (coordinates) is displayed on the display 308. It can also be displayed that the measured position has low reliability or that measurement is impossible. The correction of the measured coordinates is done so that the measured point is moved to the closest point on the reference line 405 (or a width is further added). Preferably, the measured point may be moved to a point that is shaded by the building from the satellite. Although the measured coordinates indicate that the mobile station is on the roof of the building, it is expected that the mobile station is actually located on a road close to the building because signals from the satellites existing within the angle range are blocked off. The reference line 405 on the road is determined with consideration of building shape and measurement errors and the like, similar to the width 403. Then the procedure 600 goes to step 614 and ends.

At step 606, if no satellite exists within the determined angle range, the correction of the measured position according to this embodiment of the present invention cannot be done, and therefore the procedure 600 goes to step 610 and the measured position is displayed as it is. In this case it is meaningful to display the measured position while differentiating one case where the procedure 600 comes to step 610 from step 608 from another case where the procedure 600 comes to step 610 from step 606. As seen from the above consideration, the probability that the mobile station is on the roof of the building is high in the case where the procedure 600 comes from step 608 to step 610. The probability is low in the other case.

On the other hand, the answer at step 604 is NO, where the measured position is not on the roof of the building (seems to be on a road), and the procedure 600 goes to step 616.

At step 616, it is determined whether the measured position is within a predetermined area at the periphery of the building. This predetermined area, as shown in FIG. 4, is defined by the width 403 surrounding the building. The predetermined area defined by the width 403 is a geometric area where the measured point is corrected to according to the embodiments of the present invention. If the measured point is not within the predetermined building side area, the procedure 600 goes to step 622, where the measured position is displayed as it is, because the measured position is reliable. Although the size of the width 403 is constant in FIG. 4 for simplicity, it can be varied considering building shape, communication environment and other factors. If the measured position is within the predetermined area surrounding the building, the procedure 600 goes to step 618.

At step 618, similar to step 606, it is determined whether there exists a satellite within the angle range determined by the angle determination unit 312. This determination is performed by utilizing the orbit information extracted from the orbit information extraction unit 3024 in the GPS receiver 302 and the angle region. If a satellite exists within the angle range, the procedure 600 goes to step 620.

Step 620 measures signal quality such as signal strength of the signals from the satellite existing within the angle range. And it is determined by the measurement unit 316 whether the signal quality exceeds a predetermined value (threshold) or it is determined by the measurement unit 316 whether such signal from the satellite can be received. If the mobile station is on a road adjacent to the building, almost the whole angle range is shaded by the building as shown in FIG. 4. Therefore, even if a satellite exists within the angle range, the signal from the satellite is blocked off and cannot be received at the mobile station with sufficient strength. Then the answer in step 620 becomes NO, and the procedure 600 goes to step 622. There is not only one satellite but also plural satellites that could exist within the angle range. In the case where a plurality of satellites exist within the angle range, if all signals from all the satellites are less than the threshold, then the procedure 600 goes to step 622.

At step 622, the measured point (coordinates) is displayed on the display as it is. In another words, the measured point (the mobile station near the building) is highly reliable or probable, and therefore displayed as the position of the mobile station.

On the other hand, if the signal strength measured at step 620 exceeds the predetermined value, the procedure 600 goes to step 624.

Figure 8:
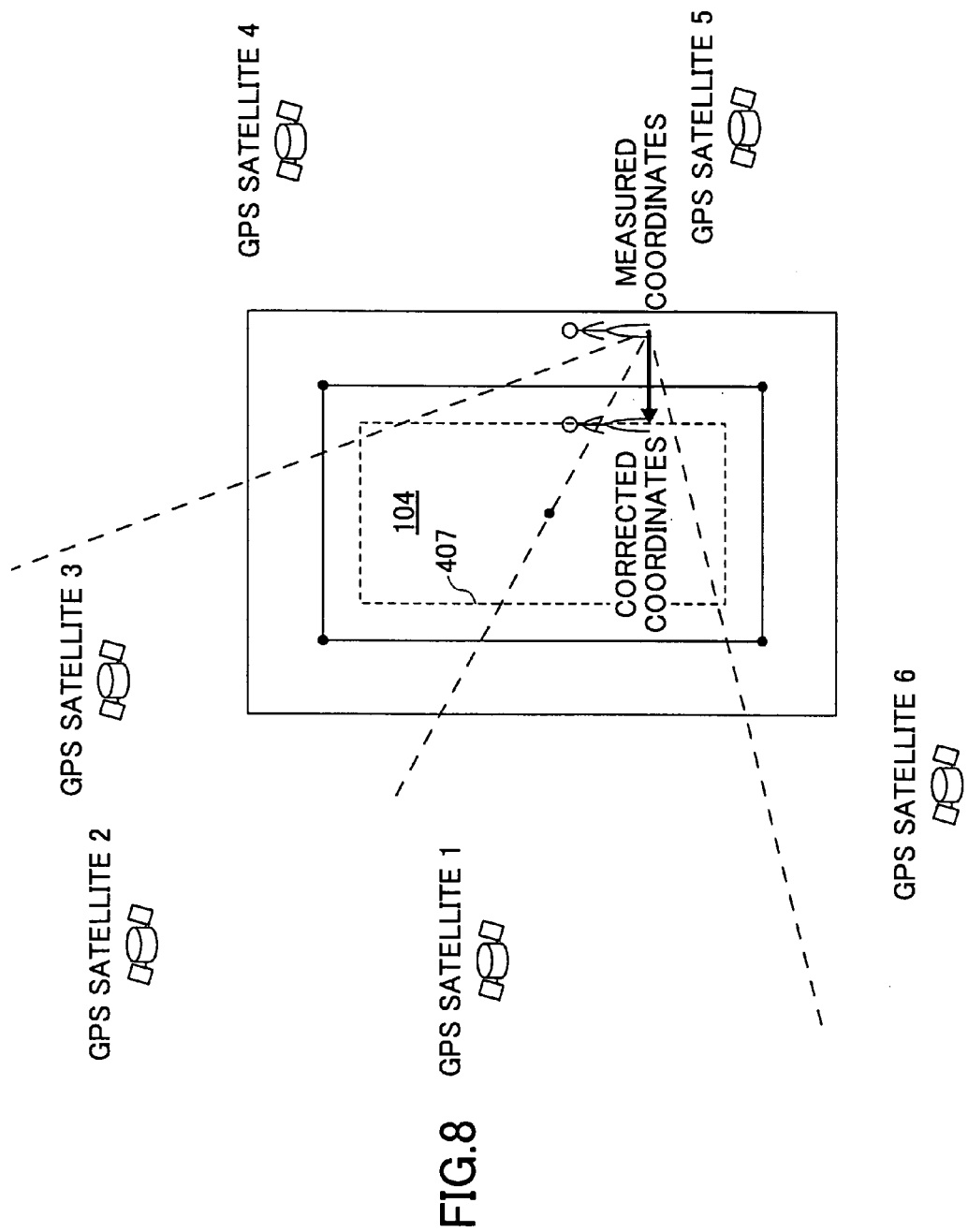
FIG. 8 is another schematic plan view illustrating positional relationship between measured coordinates and corrected coordinates.

At step 624, the correction unit 318 corrects the measured coordinates and the corrected point (coordinates) is displayed on the display 308. The correction of the measured coordinates is done so that the measured point is moved to the closest point on the reference line 407 as shown in FIG. 8. Although the measured coordinates indicate that the mobile station is on a road adjacent to the building, it is expected that the mobile station is actually located on the roof of the building because signals from the satellites existing within the angle range are not blocked off (well captured). The reference line 407 on the roof is adequately determined with consideration of building shape and measurement errors and the like, similar to the width 403. Then the procedure 600 goes to step 614 and ends.

At step 618, if no satellite exists within the determined angle range, the correction of the measured position according to this embodiment of the present invention cannot be done, and therefore the procedure 600 goes to step 622 and the measured position is displayed as it is. In this case it is meaningful to display the measured position while differentiating one case where the procedure 600 comes to step 622 from step 618 from the other case where the procedure 600 comes to step 622 from step 620, similar to step 610. Further, it is also meaningful to display the measured position while identifying that it is the procedure 600 case to step 622 from step 616, in which case there is a very low probability that the mobile station is on the roof of the building and it is probable that the mobile station is on a road.

(Second Embodiment)

Figure 9:
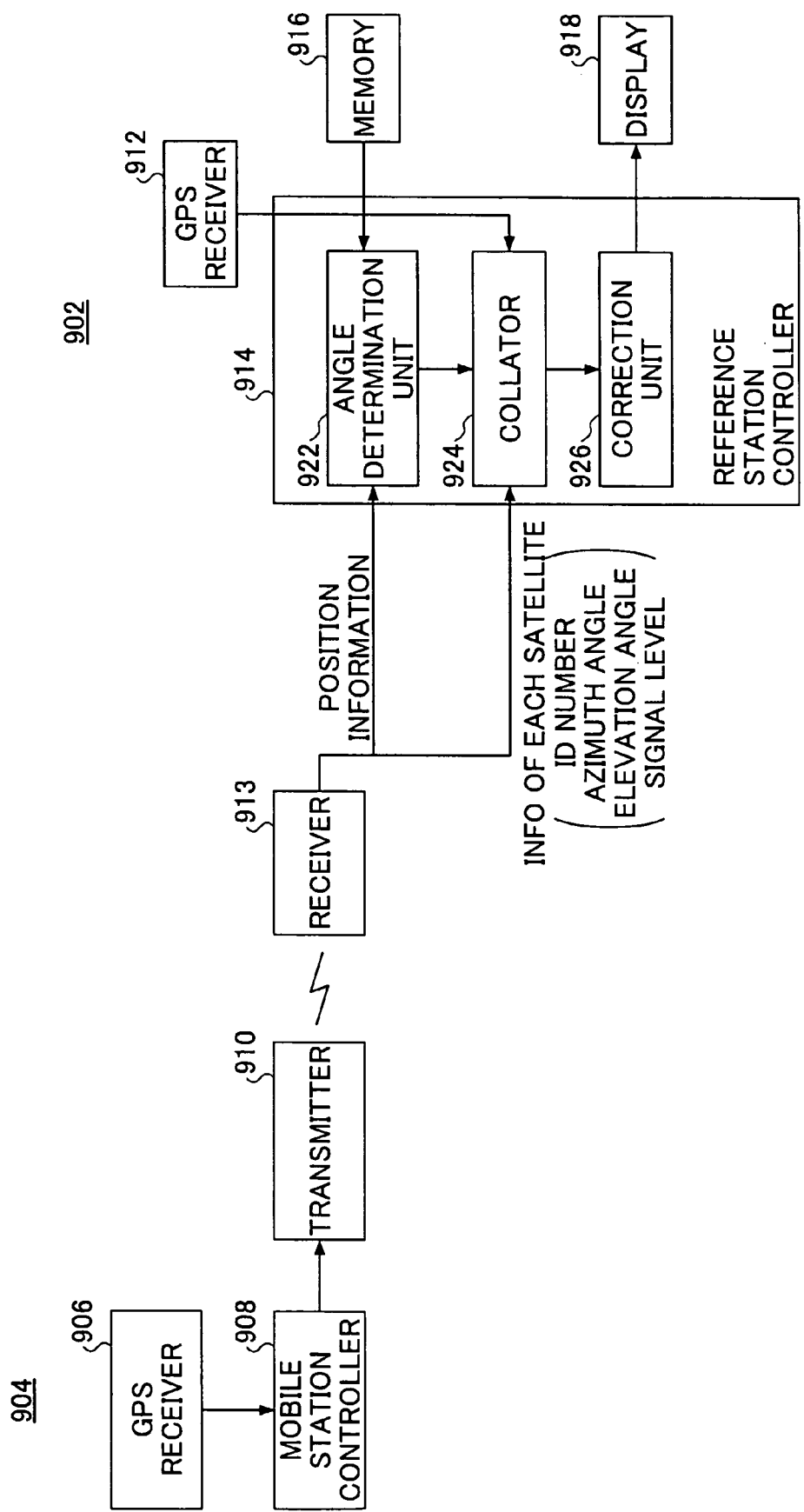
FIG. 9 is a block diagram of a position measuring apparatus according to a second embodiment of the present invention.

FIG. 9 is a block diagram showing the main functions of a position measuring system (or position calculation apparatus) including a mobile station and a base station, according to a second embodiment of the present invention. Parts shown in FIG. 9 are assigned reference numbers beginning with 9. A position measuring system includes a reference station (or parent station, base station) 902 fixed at a good location for communicating with satellites, and a mobile station (or child station) 904 moving in an area in communication with the reference station 902.

The mobile station 904 is provided with a GPS receiver 906 receiving signals from satellites, a mobile station controller 908 and a transmitter 910 for transmitting signals to the reference station 902. Other elements in the mobile station are omitted for simplicity.

The GPS receiver 906 receives position measuring signals from eight satellites out of 24 satellites orbiting the earth.

The mobile station controller 908 prepares information to report to the reference station 902, based on the signals received by the GPS receiver 906. The information to report (to be transmitted) to the reference station 902 includes ID information of the eight satellites as signal sources, signal quality (signal strength, S/N ratio, etc.) of the signals from the satellites, DOP (Dilution of Precision), mobile station coordinates measured by the mobile station, and the like. The transmitter 910 transmits the information prepared by the mobile station controller 908 to the reference station 902.

The mobile station 904 can move in a wide area in communication with the reference station 902. However, since the azimuth angle and elevation angle of each satellite seen from the mobile station should be the same as those seen from the reference station, the mobile station should be sufficiently close to the reference station that the azimuth and elevation angles from the two stations to the same satellites are the substantially the same. More concretely, GPS satellites are orbiting 20,000 km above the earth's surface, and therefore it is desirable that the distance between the mobile station and the reference station be less than several km.

On the other hand, the reference station 902 includes a GPS receiver 912 for receiving signals from satellites, a receiver 913 for receiving signals from the mobile station 904, a reference controller 914 for processing the signals, a memory 916 for storing information, and a display 918 for displaying the position of the mobile station according to the controller 914. Other elements in the reference station 902 are omitted for simplicity. The reference station 902 is fixed at a good place where it can communicate well with the satellites. Therefore, the signals received by the reference station 902 can function as reference signals for the signals received by the mobile station 904. The GPS receiver 912 also receives the position measuring signals from the satellites, similar to the GPS receiver 906. The GPS receiver 912 includes a signal measurement unit (not shown) that prepares a variety of information based on the signals received by the GPS receiver 912. The information includes ID information for the satellites as signal sources, the quality of the signals from the satellites, DOP, and a position of the reference station measured by the reference station.

The reference controller 914 includes an angle determination unit 922 that determines an angle range depending on positional relation between the measured position (measured coordinates) of the mobile station and the position of an obstacle such as a building. For example, as seen in FIGS. 4 and 5, this angle range may include an azimuth angle α and an elevation angle β. The reference controller 914 includes a collator 924 that measures quality of signals from satellites existing within the angle range determined by the angle determination unit 922. The collator 924 obtains satellite ID information of satellites having a signal quality higher than a predetermined value. Then the collator 924 collates the obtained satellite ID information (for example satellite number, ID number, etc.) with ID information received from the mobile station 904. The reference controller 914 further includes a correction unit 926 that corrects the measured position (coordinates) of the mobile station in accordance with procedure explained below with reference to FIG. 10.

A memory 916 stores a variety of information used in the reference controller 914 and/or a display 918, similar to the memory 306 shown in FIG. 3. For example, the memory 916 stores corner coordinates 401 defining a building area in a two-dimensional plane, the central coordinates 402 of the building 104, width 403 defining a predetermined area surrounding the building 104, reference lines 405, 407, etc. The reference lines 405 and 407 are the set of points that could be corrected coordinates. The width 403 defines an area on a road at the periphery of the building 104, to where the measured position would be corrected according to the embodiments of the present invention. The memory 916 also stores the parameters α and β for defining the angle range depending on the positional relation between the building and the mobile station. Further, the information stored in the memory 306 includes a threshold L for signal levels of received signals, map information such as road map information, and any other information to be used in the reference controller 914.

The display 918 can display positions of the mobile station and the building, and neighboring map information on a screen. The display 918 can be mounted near to other elements such as the reference controller 914 or the GPS controller 912 of the reference station 902. Alternatively, the display 918 can be mounted apart from these elements. Although the mobile station is not provided with a display for simplicity, the mobile station may have, of course, a display to show the position of itself and further show a corrected position of itself received from the reference station 902.

Figure 10:
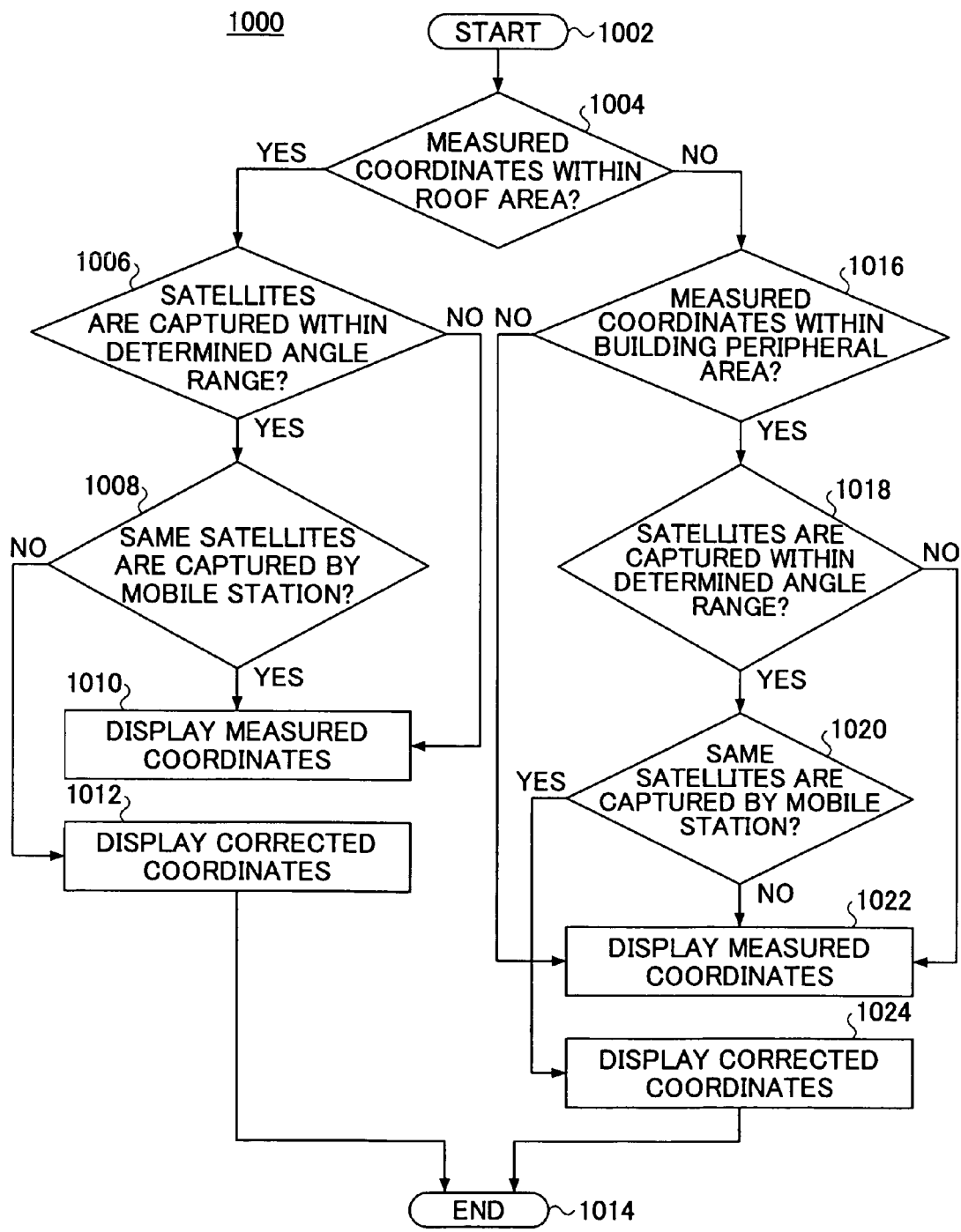
FIG. 10 is a flowchart illustrating operation of the position measuring apparatus according to the second embodiment.

FIG. 10 shows a flow chart 1000 illustrating a procedure of correcting a measured position of a mobile station according to the second embodiment of the present invention. The flow chart 1000 starts at step 1002. The GPS receiver 906 (FIG. 9) of the mobile station 904 receives signals from satellites, based on which the mobile station controller 908 prepares information to be reported to the reference station 902. The information to be reported to the reference station 902 includes ID information for the satellites as signal sources, the quality (signal strength, S/N ratio and so on) of the signals from the satellites, DOP, and a position (coordinates) of the mobile station measured by the mobile station. The measured position (coordinates) can be obtained by the triangulation method or other methods using three or more satellites. The procedures after this are performed in the reference station 902.

At step 1004, it is determined in the reference station 902 whether the measured position (coordinates) of the mobile station is within an area on a roof of the building. This determination can be performed by utilizing the measured coordinates and corner coordinates 401 (FIG. 4). If the measured position is within the area on the roof of the building, the procedure goes to step 1006.

Figure 7:
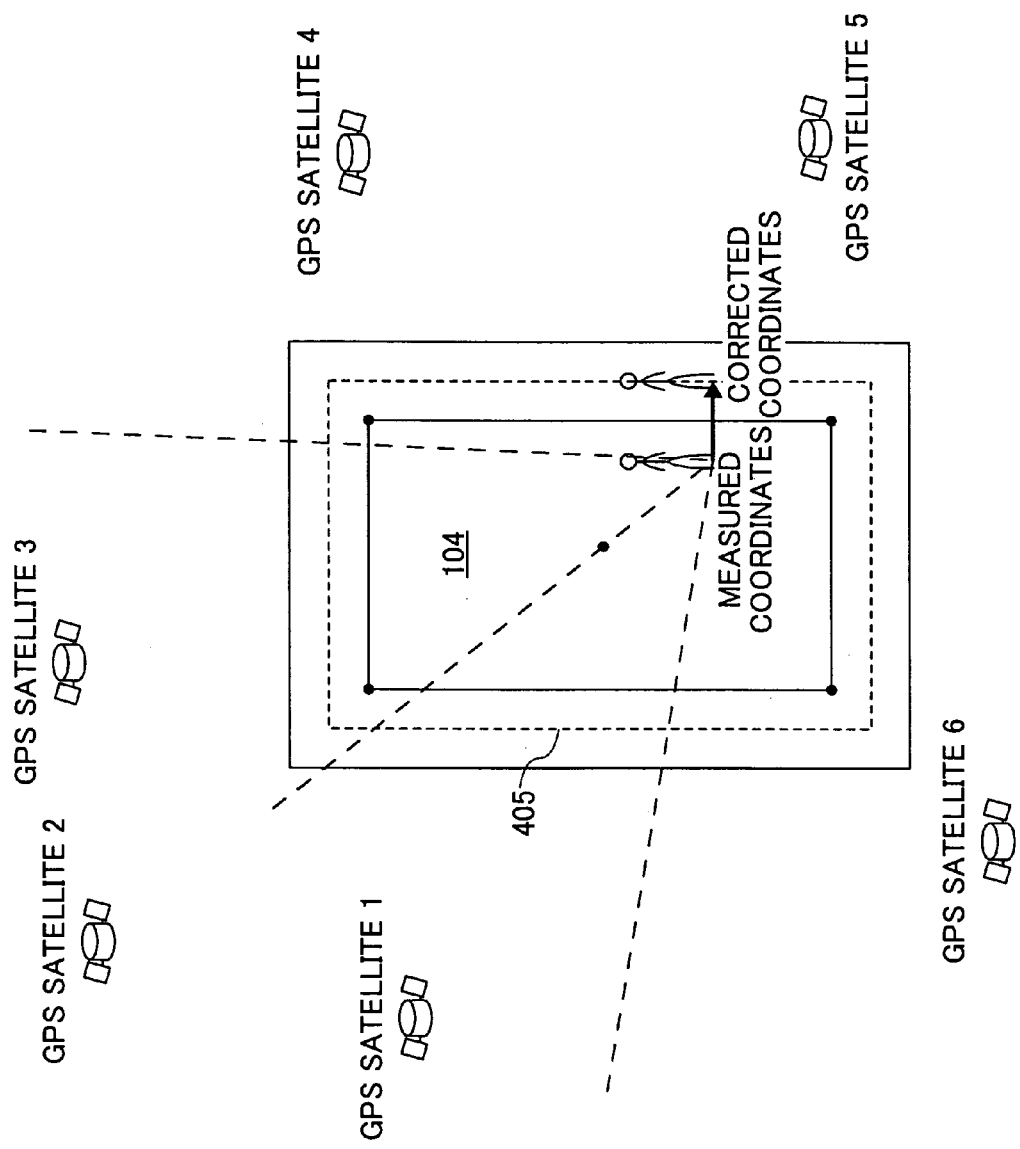
FIG. 7 is a schematic plan view illustrating positional relationship between measured coordinates and corrected coordinates.

At step 1006, it is determined whether there exists a satellite within the angle range determined by the angle determination unit 922. In this embodiment, the reference station 902 does not calculate what satellites exist in which direction based on the orbit information. The collator 924 in the reference station 902 can perform this determination by directly monitoring signals from the angle range. If the measured position of the mobile station is located as shown in FIG. 7 (the reference station is not shown), three GPS satellites #1~#3 exist within the determined angle range. If one or more satellites can be captured, ID information (for example, #1~#3) identifying the captured satellites are extracted and given to the collator 924, and the procedure goes to step 1008.

At step 1008, it is determined whether the satellites the same as those (for example the GPS satellites #1~#3) captured in the previous step are captured in the mobile station 904. This determination can be performed in the collator 924 by collating the satellite ID information received from the mobile station 904 with the satellite ID information extracted in the previous step. If the same satellites are also captured in the mobile station 904, the procedure 1000 goes to step 1010.

In determining at step 1008, it is advantageous to compare the strength of the signals received by the reference station 902 with the strength of the signals received by the mobile station 904, in addition to matching of the ID information (satellite numbers). As explained above if there is a building on the line of sight between the mobile station and a satellite, the radio wave from the satellite is blocked off. However, even if the radio wave is blocked off by the building, its reflected radio wave may arrive at the mobile station (with weak strength). If the mobile station extracts the ID information of the shaded satellite from such reflected radio wave, the correction of the measured position of the mobile station would be inadequate, resulting in a problem. Therefore, it is advantageous to compare the strength (generally signal qualities) of the two signals received by the mobile station and the reference station, and suppress undesired reflected radio waves. More concretely, for example, by determining whether the strength of a signal received from a GPS satellite by the mobile station is less than 1/A times the reception strength at the reference station, the determination at step 1008 can be performed more precisely. It is also possible to perform this kind of reception strength determination at step 1006 in order to extract ID information only from signals having reception strength greater than a certain level.

At step 1010, the measured point (coordinates) is displayed on the display as it is. In another words, the measured point (the mobile station on the roof) is highly reliable or probable, and therefore displayed as the position of the mobile station. If the mobile station actually is not on the roof, the answer of step 1008 is NO. In this case where the mobile station is on a road close to the building, almost the whole determined angle range is shaded by the building. Therefore, even if some satellites exist within the angle range, the signals from the satellites are blocked off and cannot be received at the mobile station with sufficient strength. Accordingly the answer of step 1008 becomes NO, and the procedure goes to step 1012.

At step 1012, the correction unit 926 corrects the measured coordinates and the corrected point (coordinates) is displayed on the display 918. The correction of the measured coordinates is done so that the measured point is moved to the closest point on the reference line 405 on a road (or a width that is further added). Preferably, the measured point may be moved to a point that is shaded by the building from the satellite. Although the measured coordinates indicate that the mobile station is on the roof of the building, it is expected that the mobile station is actually located on a road close to the building because signals from the satellites existing within the angle range are blocked off. The reference line 405 on the road is determined with consideration of building shape and measurement errors and the like, similar to the width 403. Then the procedure 1000 goes to step 1014 and ends.

At step 1006, if no satellite exists within the determined angle range, the correction of the measured position according to this embodiment of the present invention cannot be done, and therefore the procedure 1000 goes to step 1010 and the measured position is displayed as it is. In this case it is meaningful to display the measured position while differentiating one case where the procedure 1000 comes to step 1010 from step 1008 from the other case where the procedure 1000 comes to step 1010 from step 1006. As seen from the above consideration, the probability of the mobile station being on the roof of the building is high in the case where the procedure 1000 comes from step 1008 to step 1010. The probability is low in other case.

On the other hand, the answer at step 1004 is NO, where the measured position is outside of the roof area of the building (seems to be on a road), and the procedure 1000 goes to step 1016.

At step 1016, it is determined whether the measured position is within a predetermined area at the periphery of the building. This predetermined area, as shown in FIG. 4, is defined by the width 403 surrounding the building. The predetermined area defined by the width 403 is a geometrical area where the measured point is corrected to according to the embodiments of the present invention. If the measured point is not within the predetermined building side area, the procedure 1000 goes to step 1022, where the measured position is displayed as it is, because the measured position is reliable. If the measured position is within the predetermined area surrounding the building, the procedure 1000 goes to step 1018.

At step 1018, similar to step 1006, it is determined whether there exists a satellite within the angle range determined by the angle determination unit 922. This determination is performed in the reference station 902 by directly measuring signals from the angle range. This measuring is performed by the collator 924. If one or more satellites such as GPS satellites #1~#3 are captured within the angle range, the ID information (for example satellite numbers #1~#3) is extracted and given to the collator 924, and the procedure 1000 goes to step 1020.

At step 1020, it is determined whether the satellites the same as those (for example the GPS satellites #1~#3) captured in the previous step are captured in the mobile station 904. This determination can be performed in the collator 924 by collating the satellite ID information received from the mobile station 904 with the satellite ID information extracted in the previous step. If the same satellites are not captured in the mobile station 904, the procedure 1000 goes to step 1022.

At step 1022, the measured point (coordinates) is displayed on the display as it is. In another words, the measured point (the mobile station near the building) is highly reliable or probable, and therefore displayed as the position of the mobile station.

On the other hand, at step 1020, if the same satellites are also captured in the mobile station, the procedure 1000 goes to step 1024.

At step 1024, the correction unit 926 corrects the measured coordinates and the corrected point (coordinates) is displayed on the display 918. The correction of the measured coordinates is done so that the measured point is moved to the closest point on the reference line 407 as shown in FIG. 8. Then the procedure 1000 goes to step 1014 and ends.

At step 1018, if no satellite exists within the determined angle range, the correction of the measured position according to this embodiment of the present invention cannot be done, and therefore the procedure 1000 goes to step 1022 and the measured position is displayed as it is. In this case it is meaningful to display the measured position while differentiating one case where the procedure 1000 comes to step 1022 from step 1018 from the other case where the procedure 1000 comes to step 1022 from step 1016, similar at step 1010. Further, it is also meaningful to display the measured position while identifying that in the procedure 1000 in the case of coming to step 1022 from step 1016, there is a very low probability that the mobile station is on the roof of the building and it is probable that the mobile station is on a road.

(Third Embodiment)

In the second embodiment, the mobile station 904 transmits information regarding itself to the reference station 902, and the reference station 902 corrects the measured position of the mobile station. However, the mobile station may have such a correction function.

Figure 11:
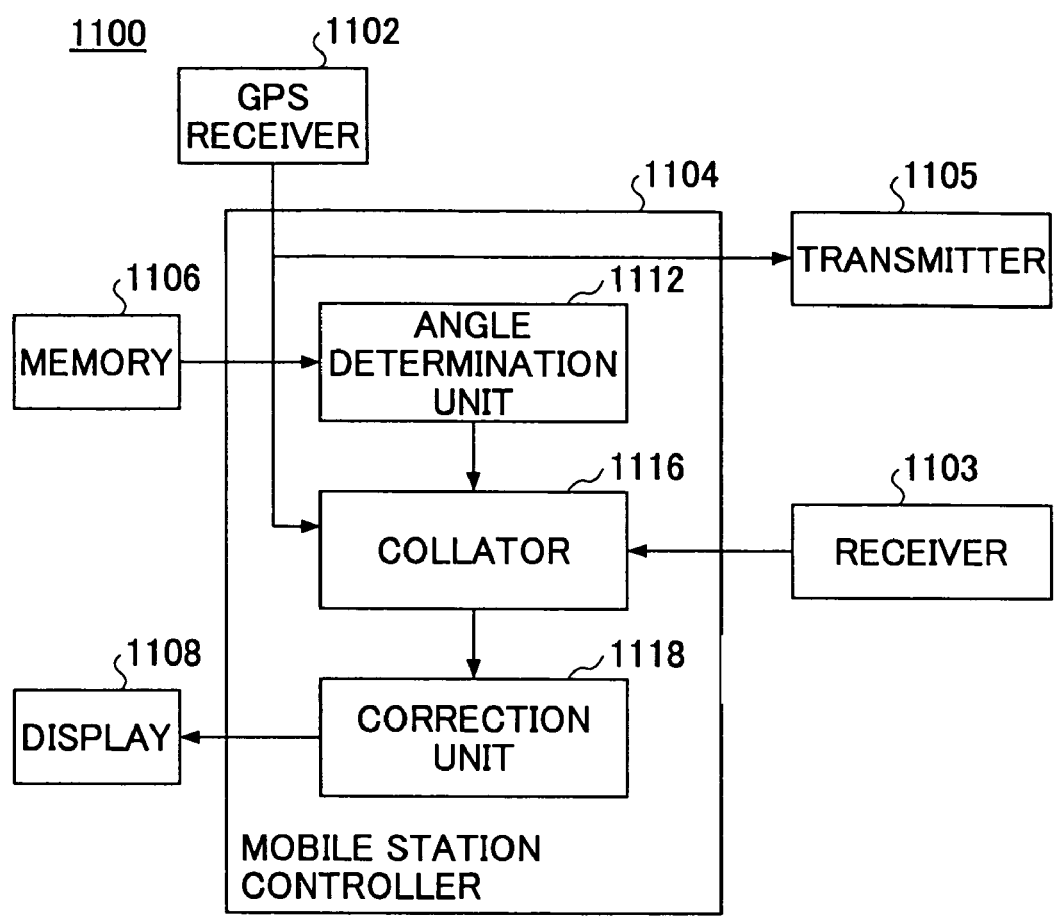
FIG. 11 is a block diagram of a position measuring apparatus according to a third embodiment of the present invention.

FIG. 11 shows a block diagram showing the main functions of a mobile station as a position measuring apparatus. The mobile station 1100 can be used for replacing the mobile station shown in FIG. 9. The mobile station 1100 includes a GPS receiver 1102 receiving signals from satellites, a receiver 1103 and a transmitter 1105 for communicating with a reference station, a mobile station controller 1104 for processing signals, a memory 1106 for storing information, and a display 1108 for displaying the position of the mobile station according to the mobile station controller 1104.

The GPS receiver 1102 includes a signal measurement unit (not shown) that prepares a variety of signals based on signals received from satellites. The information includes ID information of the satellites as signal sources, signal quality (signal strength, S/N ratio, etc.) of the signals from the satellites, DOP (Dilution of Precision), reference station coordinates measured by the reference station, and the like. The mobile station controller 1104 includes an angle determination unit 1112 that determines an angle range depending on position relation between the measured position of the mobile station and an obstacle such as a building. The mobile station controller 1104 includes a collator 1116 that measures quality of signals from satellites existing within the angle range determined by the angle determination unit 1112, and obtains ID information of satellites transmitting signals having quality better than a predetermined level. The collator 1116 collates ID information obtained through the receiver 1103 from the reference station with ID information obtained by the measurement. The mobile station controller 1104 includes a correction unit 1118 that corrects the measured position of the mobile station according to procedure explained below.

The memory 1106 stores a variety of information used in the mobile station controller 1104 and/or the display 1108, similar to the memories 306, 916 (FIGS. 3 and 9). The display 1108 can display the positions of the mobile station and the building, and neighboring map information on a screen.

The procedure for correcting the measured coordinates according to this embodiment is generally the same as the procedure shown in FIG. 10, but different in that steps 1004 through 1024 are done in the mobile station 1100 and the reference station supplies predetermined information to the mobile station.

The procedure starts at step 1002. At step 1004, it is determined in the mobile station 1100 whether the measured position (coordinates) of the mobile station is within an area on a roof of the building. If the measured position is within the area on the roof of the building, the procedure goes to step 1006.

At step 1006, it is determined whether there exists a satellite within an angle range determined by the angle determination unit 1112. In this embodiment, both the mobile station and the reference station can directly check what satellites exist within their angle range to make determination for step 1006. In this case the angle determination unit 1112 of the mobile station 1100 determines the angle range based on the measured position obtained by the signal measurement unit of the GPS receiver 1102. The collator 1116 determines what satellites exist within the angle range. The mobile station 1100 transmits the measured position to the reference station 902 through the transmitter 1105. Based on the measured position, the reference station 902 determines its own angle range, and the determination for step 1006 can be done also in the reference station. Alternatively, the mobile station 1100 can transmit information on the angle range determined by the angle determination unit 1112 to the reference station, and the reference station can omit the procedure for determining the angle range. In either case, if one or more satellites can be captured, ID information (for example, #1~#3) identifying the captured satellites is extracted. The results (mainly, ID numbers such as satellite number) in the mobile station 1100 and the results in the reference station are prepared by the collator 1116, and the procedure goes to step 1008.

At step 1008, it is determined in the collator 1116 whether the satellites the same as those (for example the GPS satellites #1~#3) captured in the previous step are captured in the mobile station 1100. If the same satellites are also captured in the mobile station, the procedure 1000 goes to step 1010.

At step 1010, the measured point (the mobile station on the roof) is highly reliable or probable, and therefore displayed as the position of the mobile station. If the mobile station is not actually on the roof but on a road close to the building, the answer of step 1008 is NO and the procedure 1000 goes to step 1012. At step 1006, if no satellite exists within the determined angle range, the procedure 1000 goes to step 1010, where the measured position is displayed as it is.

At step 1012, the correction unit 1118 corrects the measured coordinates and the corrected point (coordinates) is displayed on the display 1108. The correction of the measured coordinates is done so that the measured point is moved to the closest point on the reference line 405 on a road (or a width that is further added). And the procedure 1000 goes to step 1014 and ends.

On the other hand, if the answer at step 1004 is NO, where the measured position is outside of the roof area of the building (seems to be on a road), the procedure 1000 goes to step 1016.

At step 1016, it is determined whether the measured position is within a predetermined area at the periphery of the building. If the measured point is not within the predetermined building side area, the procedure 1000 goes to step 1022, where the measured position is displayed as it is, because the measured position is reliable. If the measured position is within the predetermined area surrounding the building, the procedure 1000 goes to step 1018.

At step 1018, similar to step 1006, it is determined whether there exists a satellite within the angle range determined by the angle determination unit 1122. If one or more satellites such as GPS satellites #1~#3 are captured within the angle range, the ID information (for example satellite numbers #1~#3) is extracted and given to the collator 1116, and the procedure 1000 goes to step 1020.

At step 1020, it is determined whether the satellites same as those (for example the GPS satellites #1~#3) captured in the previous step are captured in the mobile station 904. If the same satellites are not captured in the mobile station, the procedure 1000 goes to step 1022.

At step 1022, the measured point (the mobile station near the building) is highly reliable or probable, and therefore displayed as the position of the mobile station. At step 1018, if no satellite exists within the determined angle range, the procedure 1000 goes to step 1022, where the measured position is displayed as it is.

On the other hand, at step 1020, if the same satellites are also captured in the mobile station, the procedure 1000 goes to step 1024.

At step 1024, the correction unit 1118 corrects the measured coordinates and the corrected point (coordinates) is displayed on the display 1108. The correction of the measured coordinates is done so that the measured point is moved to the closest point on the reference line 407 as shown in FIG. 8. Then the procedure 1000 goes to step 1014 and ends.

According to the present invention, the measured position of the mobile station can be adequately corrected.

According to the first embodiment, satellites existing within the angle range are calculated based on the extracted orbit information, the qualities of signals from the satellite are measured, and a measured position of the mobile station is corrected to another position having a different height. Thereby it can be reliably presumed that the mobile station is on the roof of the building or on a road close to the building.

According to the second embodiment, satellites captured (signals received) by the mobile station and satellites captured by the reference station are collated in the reference station. Based on the result of the collation, it is determined in the reference station whether the measured position of the mobile station should be corrected. The correction of the measured position is done in the reference station, and therefore the structure of the mobile station can be simplified. Especially, as for the correction of the measured position, the mobile station does not have to keep map information within a geometric area where the mobile station can move around. This embodiment is advantageous when a number of mobile stations should be managed by one reference station. In this embodiment, satellites captured by the reference station and satellites captured by the mobile station are collated, and therefore the correction can be made even if there is a common obstacle (such as mountains) against the reference station and the mobile station. Even in a case where the mobile station itself cannot correct the measured position, information such as orbit information obtained by the reference station makes it possible to correct the measured position of the mobile station.

According to the third embodiment, satellites captured by the mobile station and satellites captured by the reference station are collated in the mobile station, and based on the result of the collation it is determined in the mobile station whether the measured position of the mobile station should be corrected. Since main processes regarding correction of the measured position are done in the mobile station, the mobile station can determine its own position precisely.

The present invention is not limited to these embodiments, but various variations and modifications may be made without departing from the scope of the present invention.

The present application is based on Japanese Priority Application No. 2003-304845 filed on Aug. 28, 2003 with the Japanese Patent Office, the entire contents of that are hereby incorporated by reference.

What is claimed is:

1. A position measuring apparatus, comprising:
a receiver for receiving signals from a plurality of satellites and measuring a position of a mobile station based on the received signals;
an angle determination unit for determining angle range depending on positional relation between the measured position of the mobile station and an obstacle;
an orbit information extraction unit for extracting orbit information indicating orbits of the satellites from the received signals;
a measurement unit for measuring quality of the signals from at least one of the satellites that is expected to exist within the angle range based on the extracted orbit information; and
a correction unit for correcting the measured position of the mobile station to another position having a different height, according to the measured quality of the signal from the at least one of the satellites.

2. The position measuring apparatus as claimed in claim 1, further comprising:
a display for displaying positions of the mobile station and the obstacle on a screen.

3. The position measuring apparatus as claimed in claim 1, wherein the correction unit corrects whether the mobile station is on a roof of a building or on a road at the periphery of the building.

4. The position measuring apparatus as claimed in claim 3, wherein the correction unit determines that the mobile station is on the roof of the building, when strength of the signal from the at least one of the satellites exceeds a predetermined value.

5. The position measuring apparatus as claimed in claim 3, wherein the correction unit determines that the mobile station is on the road at the periphery of the building, when strength of the signal from the at least one of the satellites is less than a predetermined value.

6. A position measuring apparatus mounted in a fixed reference station, for estimating a position of a mobile station moving in an area in communication with the fixed reference station, comprising:
a memory for storing position information relating to an obstacle;

a receiver for receiving position information of the mobile station that has been measured by the mobile station based on signals from a plurality of GPS satellites, and for receiving mobile station satellite information indicating at least one of the satellites from which the mobile station has received a signal;

a collator for collating reference station satellite information indicating at least one of the satellites from which the reference station has received a signal, with the mobile station satellite information, wherein a result of the collation indicates a reliable measured position if said satellites from which the mobile station received a signal are the same as said satellites from which the reference station received a signal, and an unreliable measured position if said satellites from which the mobile station received a signal are nor the same as said satellites from which the reference station received a signal; and a correction unit for correcting the measured position of the mobile station based on the result of the collation and coordinates of the obstacle.

7. The position measuring apparatus as claimed in claim 6, further comprising:

a display for displaying positions of the mobile station and the obstacle on a screen.

8. The position measuring apparatus as claimed in claim 6, wherein the mobile station satellite information indicates one of the satellites from which the mobile station has received a signal higher than a predetermined quality.

9. The position measuring apparatus as claimed in claim 6, wherein the mobile station satellite information includes ID information of the satellites from which the mobile station received a signal, and the reference station satellite information includes ID information of the satellites from which the reference station received a signal, and wherein whether the satellites from which the mobile station received a signal are the same as the satellites from which the reference station received a signal is based on whether the ID information of said satellites is the same.

10. A position measuring apparatus mounted in a fixed reference station, for estimating a position of a mobile station moving in an area in communication with the fixed reference station, comprising:

a memory for storing position information relating to an obstacle;

a receiver for receiving position information of the mobile station that has been measured by the mobile station based on signals from a plurality of GPS satellites, and for receiving mobile station satellite information indicating at least one of the satellites from which the mobile station has received a signal;

a collator for collating reference station satellite information indicating at least one of the satellites from which the reference station has received a signal, with the mobile station satellite information; and a correction unit for correcting the measured position of the mobile station based on a result of the collation and coordinates of the obstacle, wherein the correction unit corrects whether the mobile station is on a roof of a building as the obstacle or on a road at the periphery of the building.

11. The position measuring apparatus as claimed in claim 10, wherein the correction unit determines that the mobile station is on the roof of the building, when the mobile station satellite information matches the reference station satellite information.

12. The position measuring apparatus as claimed in claim 10, wherein the correction unit determines that the mobile station is on the road at the periphery of the building, when the mobile station satellite information does not match the reference station satellite information.

13. A position measuring apparatus provided in a mobile station, for estimating a position of the mobile station moving in an area in communication with a fixed reference station, comprising:

a memory for storing position information relating to an obstacle;

a position measuring unit for measuring a position of the mobile station, based on signals from a plurality of GPS satellites;

a receiver for receiving reference station satellite information indicating at least one of the satellites from which the reference station has received a signal;

a collator for collating mobile station satellite information indicating the at least one of the satellites from which the mobile station has received a signal, with the reference station satellite information, wherein a result of the collation indicates a reliable measured position if said satellites from which the mobile station received a signal are the same as said satellites from which the reference station received a signal, and an unreliable measured position if said satellites from which the mobile station received a signal are not the same as said satellites from which the reference station received a signal; and a correction unit for correcting the measured position of the mobile station based on the result of the collation and coordinates of the obstacle.

14. The position measuring apparatus as claimed in claim 13, further comprising:

a display for displaying positions of the mobile station and the obstacle on a screen.

15. The position measuring apparatus as claimed in claim 13, wherein the mobile station satellite information indicates one of the satellites from which the mobile station has received a signal higher than a predetermined quality.

16. The position measuring apparatus as claimed in claim 13, wherein the mobile station satellite information includes ID information of the satellites from which the mobile station received a signal, and the reference station satellite information includes ID information of the satellites from which the reference station received a signal, and wherein whether the satellites from which the mobile station received a signal are the same as the satellites from which the reference station received a signal is based on whether the ID information of said satellites is the same.

17. A position measuring apparatus provided in a mobile station, for estimating a position of the mobile station moving in an area in communication with a fixed reference station, comprising:

a memory for storing position information relating to a building;

a position measuring unit for measuring a position of the mobile station, based on signals from a plurality of GPS satellites;

a receiver for receiving reference station satellite information indicating at least one of the satellites from which the reference station has received a signal;

a collator for collating mobile station satellite information indicating the at least one of the satellites from which the mobile station has received a signal, with the reference station satellite information; and a correction unit for correcting the measured position of the mobile station based on a result of the collation and coordinates of the building, wherein the correction unit corrects whether the mobile station is on a roof of the building or on a road at the periphery of the building.

18. The position measuring apparatus as claimed in claim 17, wherein the correction unit determines that the mobile station is on the roof of the building, when the mobile station satellite information matches the reference station satellite information.

19. The position measuring apparatus as claimed in claim 17, wherein the correction unit determines that the mobile station is on the road at the periphery of the building, when the mobile station satellite information does not match the reference station satellite information.

20. A position measuring apparatus for measuring a position of the apparatus using signals received from a plurality of satellites, comprising obstacle reflecting means containing obstacle information, characterized in that if the apparatus cannot receive a signal from one of the satellites or quality of a received signal is lower than a predetermined value, the apparatus determines that the apparatus is not positioned in an area where there is no obstacle between the satellite and the apparatus, or determines that reliability for the measured position of the apparatus is lower than that in a case where the apparatus is positioned in said area, the position measuring apparatus further characterized in that if the reliability is determined as lower, then coordinates of the measured position are corrected to a corrected position closer or within said area.

21. A position measuring apparatus for measuring a position of the apparatus using signals received from a plurality of satellites, comprising a correction unit, characterized in that if there is an obstacle between the measured position of the apparatus and a satellite, and a signal from the satellite can be received or its quality is higher than a predetermined value, then the correction unit corrects the measured position of the apparatus to an area where there is no obstacle between the satellite and the apparatus.

22. A position measuring apparatus for measuring a position of the apparatus using signals received from a plurality of satellites, comprising a correction unit, characterized in that if there is no obstacle between the measured position of the apparatus and a satellite and a signal from the satellite cannot be received or its quality is lower than a predetermined value, then the correction unit corrects the measured position of the apparatus to an area where there is an obstacle between the satellite and the apparatus.

23. The position measuring apparatus as claimed in claim 22, wherein the correction unit corrects the measured position of the apparatus by an amount less than a predetermined value.

24. A position calculating apparatus for measuring a position of the apparatus based on information obtained from a GPS receiver, comprising obstacle reflecting means containing obstacle information, characterized in that if the obstacle reflecting means obtains the fact from the GPS receiver that a signal from a satellite cannot be received or its quality is lower than a predetermined value, and there is no obstacle between the satellite and the measured position, then the obstacle reflecting means determines that the apparatus is not at the measured position or determines that reliability for the measured position is lower than that in a case where there is an obstacle between the satellite and the measured position.

* * * * *